W. WRIGHT.
COMBINED TYPEWRITING AND COMPUTING MACHINE.
APPLICATION FILED AUG. 4, 1917.
1,349,247.
Patented Aug. 10, 1920.
3 SHEETS—SHEET 3.
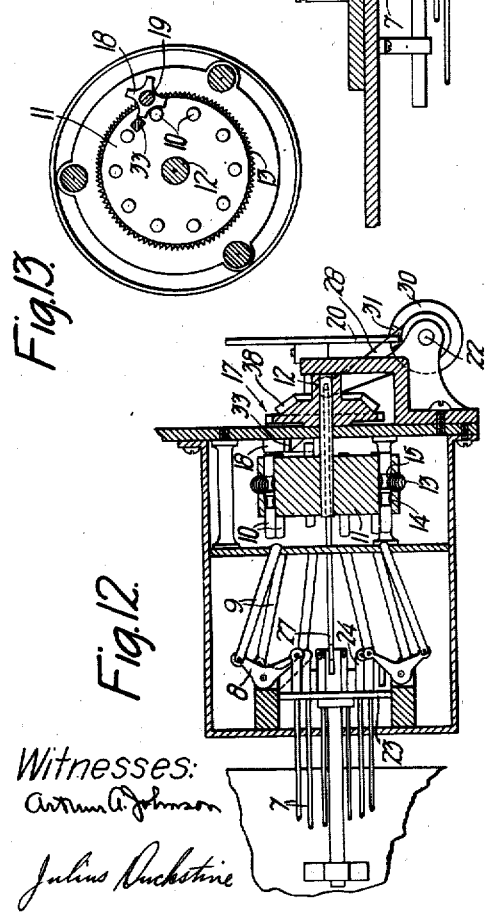
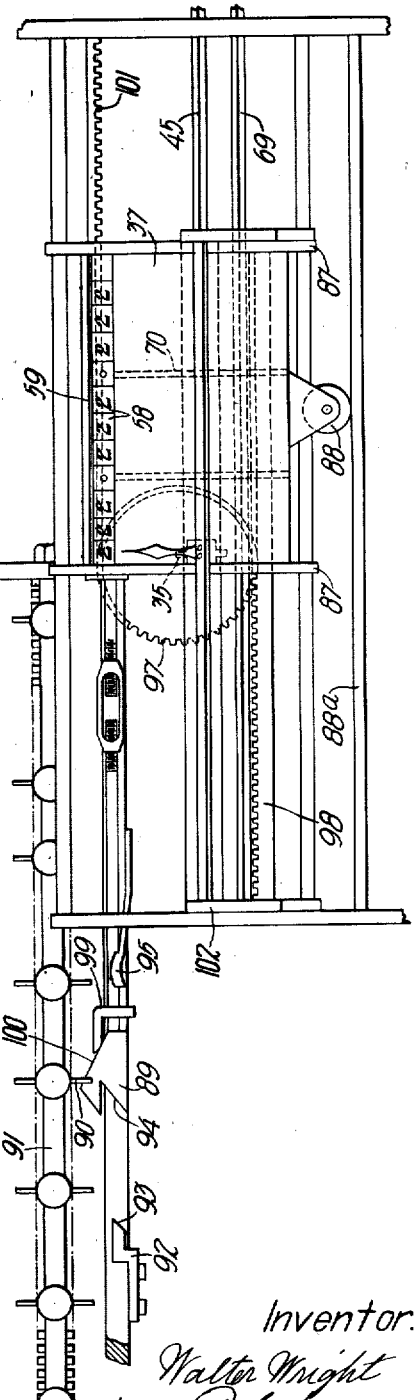
Witnesses:
Inventor:
Walter Wright
by B. C. Stickney
Attorney

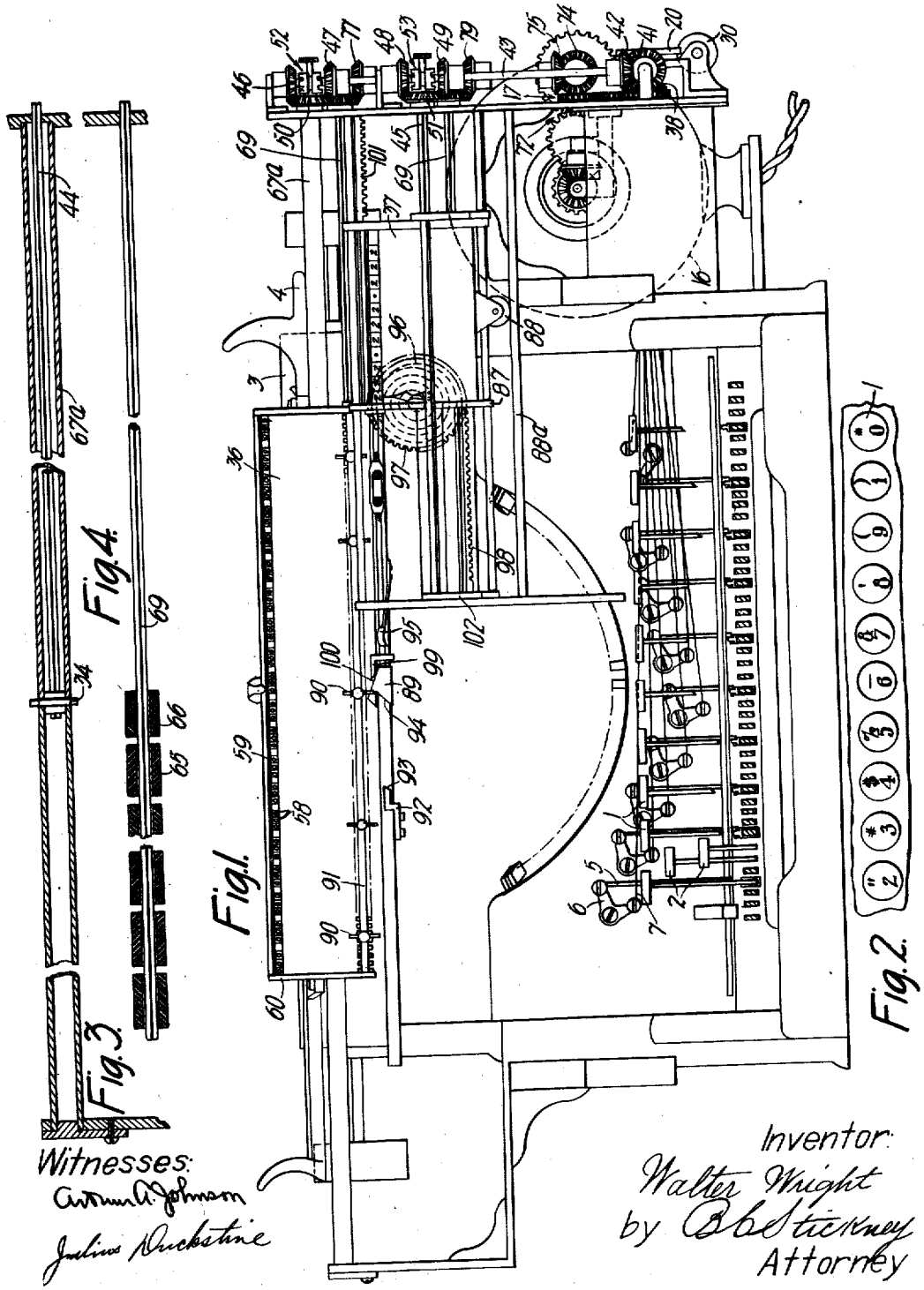

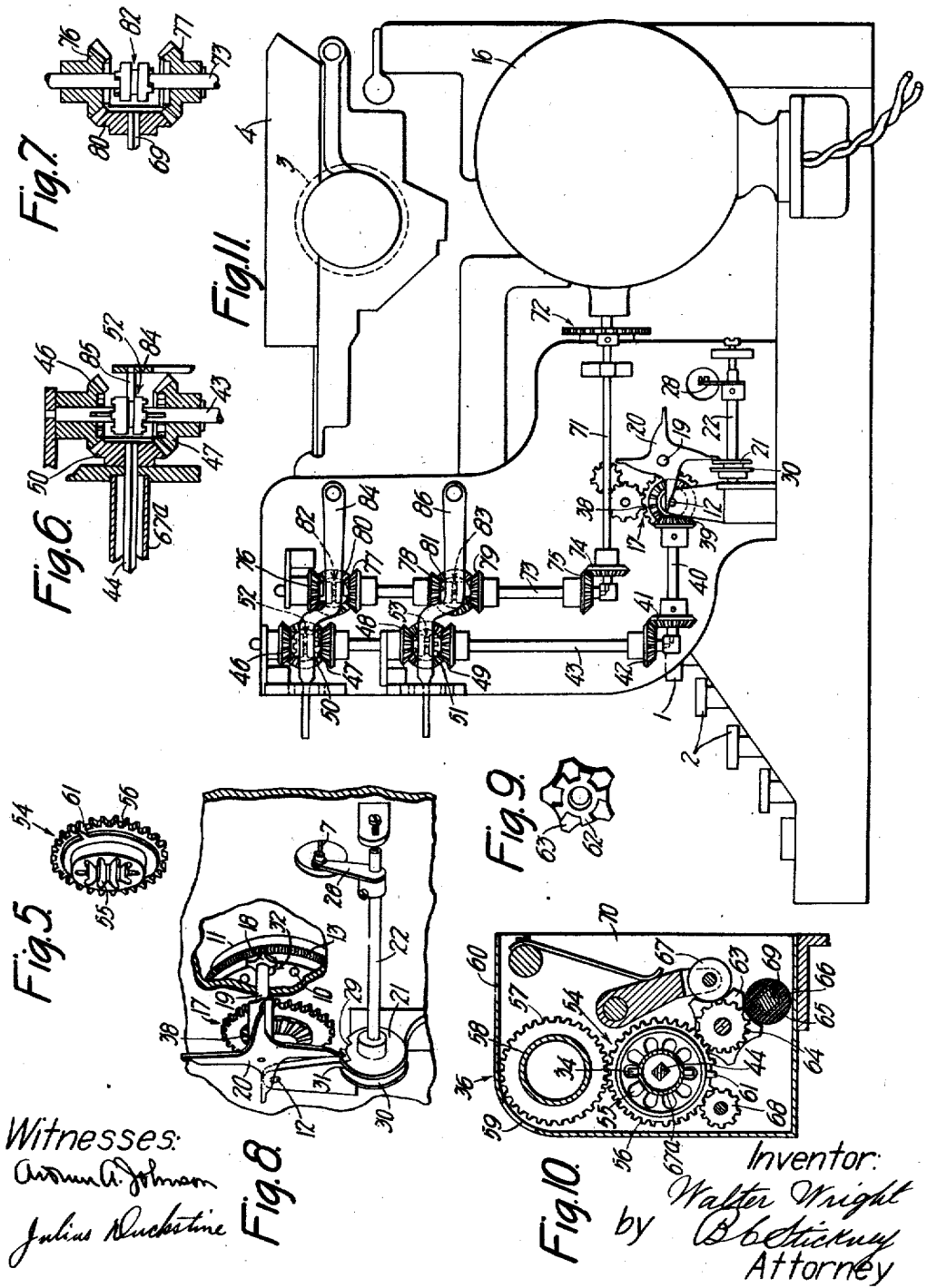

UNITED STATES PATENT OFFICE.

WALTER WRIGHT, OF NEW YORK, N. Y., ASSIGNOR, BY MESNE ASSIGNMENTS, TO UNDERWOOD COMPUTING MACHINE COMPANY, A CORPORATION OF NEW YORK.

COMBINED TYPEWRITING AND COMPUTING MACHINE.

1,349,247.   Specification of Letters Patent.   Patented Aug. 10, 1920.

Original application filed April 20, 1908, Serial No. 428,020. Divided and this application filed August 4, 1917. Serial No. 184,404.

*To all whom it may concern:*

Be it known that I, WALTER WRIGHT, a citizen of the United States, residing in New York, in the county of New York and State of New York, have invented certain new and useful Improvements in Combined Typewriting and Computing Machines, of which the following is a specification.

This invention relates to an improvement in combined typewriting and computing machines of the Underwood-Wright type, and is a division of my application, Serial No. 428,020, filed April 20, 1908.

A long totalizer comprises a series of computing wheels, which may be computed in groups to correspond with several major columns or computing zones as typewritten. The long totalizer adds a series of vertical columns of numbers, one for each computing zone. A short totalizer may add horizontally, or, in other words, cross-total the same figures which are added vertically in the groups of computing wheels of the long totalizer. Master wheels are provided for computing in the two totalizers in synchronism.

In this modification, the master wheel for the long totalizer is stationary, while the totalizer itself travels along with the carriage. The short or secondary totalizer travels with the long totalizer and thus with the carriage, and at the same speed as the long totalizer and carriage. The master wheel for the short totalizer, however, travels at the same time that the short totalizer travels, but in the opposite direction. This gives in the aggregate double the relative movement between the computing wheels and the master wheel for the short totalizer as compared with the relative movement between the master wheel and the computing wheels of the long totalizer. This enables the computing wheels to be twice as wide, so as to have the numbers thereon larger and more easily readable. The relative movement between the master wheel and the computing wheels for the short totalizer is obtained by providing a plurality of pick-up stops on the long totalizer, which engage one by one with a connecting hook joined to the carriage of the short totalizer. The short totalizer is provided with a rack, which drives a gear, the latter, in turn, driving a rack connected to a carriage on which the master wheel for the short totalizer is mounted. Inasmuch as the racks face in opposite directions, the master wheel travels in the opposite direction to the movement of the short totalizer and at the same speed. The hook is disconnected at the end of each computing zone or major column and the master wheel and short totalizer are returned to their initial relative positions by a spring wound up during their advancing movements. This occurs repeatedly with each pick-up stop or lug carried by the long totalizer connecting the hook to the long totalizer, so as to obtain a series of vibratory relative movements between the short totalizer and the master wheel therefor, for one continuous traveling movement of the typewriter carriage and the long totalizer.

The indexing or valuating mechanism is of the escapement type, as fully described and claimed in the above-mentioned parent application. This escapement mechanism controls the drive of the master wheels from a continuously running motor, which turns the master wheels amounts corresponding to the particular numeral key struck. Reversing gearing is provided between the motor and the master wheels and also between the motor and tens-carrying mechanism, so that they may be rotated for either addition or subtraction. This reversing mechanism may be thrown to a neutral position, in which either one or both of the totalizers may be silenced.

Other features and advantages will hereinafter appear.

In the accompanying drawings,

Figure 1 is a front view in elevation, showing the two totalizers connected in their travel, so that the short totalizer is computing in synchronism with a group of computing wheels of the long totalizer.

Fig. 2 is a detail top plan view of the numeral keys, indicating that they are used to print various signs as well as digits.

Fig. 3 is a vertical section, taken from right to left, through the long totalizer master-wheel drive and the supporting means for the same.

Fig. 4 is a horizontal vertical section along the tens-carrying shaft for the long totalizer.

Fig. 5 is a detail perspective view of one of the computing wheels, showing the carry-over teeth which start carry-over operations.

Fig. 6 is a vertical section through the reversing gear shift for the master-wheel shaft of the long totalizer.

Fig. 7 is a vertical section through one of the carry-over reversing gear shifts.

Fig. 8 is a detail perspective view of the indexing or valuating escapement mechanism.

Fig. 9 is a detail perspective view of one of the carry-over units.

Fig. 10 is a vertical section, taken from front to rear through one of the totalizers, showing the method of driving the computing and dial wheels from the master-wheel shaft.

Fig. 11 is a detail side view in elevation, showing the drive train from the motor and the escapement mechanism to the tens-carrying and master-wheel shafts.

Fig. 12 is a vertical section through the escapement mechanism, showing the same in its normal position before a numeral key is actuated.

Fig. 13 is a vertical section, taken from front to rear, showing the stop-wheel in engagement with one of the pins of the escapement pin-wheel.

Fig. 14 is a horizontal section, showing one of the jacks or plungers as operated by its associated numeral key to set the apposite pin in determining a computing movement.

Fig. 15 is an enlarged front view in elevation, showing how the short totalizer is picked up and carried along with the long totalizer.

Numeral keys 1 and alphabet keys 2 operate type actions (not shown), to print digits and other characters by striking the types against the front side of a platen 3, mounted on a carriage 4. The carriage 4 has the usual step-by-step traveling movement under the control of an escapement mechanism in a manner common to Underwood typewriting machines. This typewriting mechanism permits digits to be written in several groups or vertical major columns which correspond to different computing zones.

In order that the numerals as typewritten may be computed, each of the numeral keys when operated draws down on a link 5 to rock a bell crank 6, which, in turn, pulls on a link 7 to rock a bell crank 8. The bell crank 8 is connected to thrust forward a plunger or jack 9, so that the latter will set the apposite one of a circular series of pins 10 from a position projecting on the left-hand side of a pin-wheel 11 (Fig. 14), to a position projecting on the right-hand side of said pin-wheel. This pin-wheel is secured to a shaft 12 and determines the rotation thereof. The pins 10 are locked in either position of adjustment by means of a circular spring 13, Fig. 12, which engages alternately in grooves 14 and 15, provided in each of the pins 10. The shaft 12 is normally under a tendency to rotate under the drive of an electric motor 16, but is locked against rotation by the pin-wheel 11 in a manner to be described. The motor 16 is connected to drive the shaft 12 by means of a train of gearing, indicated in general at 17, which includes a slip-clutch (not shown), so that when the shaft 12 is locked against rotation, the motor 16 may rotate idly.

The pin-wheel 11 is itself held against rotation by a stop-wheel 18, Figs. 8 and 13, which engages a set pin on the wheel 11. The stop-wheel 18 is secured to a shaft 19, which is locked against rotation by a star-wheel 20. One of the arms or teeth of the star-wheel 20 normally engages a stop disk 21, secured to a rock shaft 22. This rock shaft 22 is controlled in its movement from the numeral keys 1, so that when a numeral key is struck to a set pin 10, then the shaft 22 is rocked to permit a rotation of the star-wheel 20, the stop-wheel 18, the pin-wheel 11, and thus the shaft 19. This connection includes a universal disk 23, which lies in the path of heads 24, provided on each of the links 7. This universal disk 23, when operated at the depression of the numeral key, swings a lever 25 about its intermediate pivot against the tension of a spring 26, so as to thrust on a link 27. The link 27 is pivotally connected to an arm 28 secured to the rock shaft 22.

Thus, at the setting of a new pin 10, the shaft 22 is rocked to permit the arm or tooth of the star-wheel 20 to escape from the disk 21 through an opening 29, which is brought into register with the arm of the star-wheel 20 in engagement with the disk 21. This arm only escapes to a second stop-disk 30 at this time, as the rocking of the shaft 22 brings a whole portion of the disk 30 into the path of the arm on the star-wheel 20. When the numeral key struck returns to its normal position, however, the shaft 22 rocks backwardly, due to the pull of the spring 26, permitting the arm of the star-wheel 20 to escape through an opening 31, provided in the second disk 30. This will permit the star-wheel 20 to rotate one quarter of a revolution, as there are four arms shown. The stop-wheel 18 likewise rotates one quarter of a revolution to permit the previously set pin, indicated especially at 32 in Fig. 8, to escape from the stop-wheel 18; then the pin-wheel 11 will be free to rotate under the drive of the motor 16.

The amount of rotation of the pin-wheel 11 and the shaft 12, to which it is secured, depends on the position of the newly set pin with respect to the previously set pin 32. This distance will depend upon the value of the numeral key actuated and will be a number of pin-space distances from "1" to "9" from the previously set pin, according to which of the numeral keys from "1" to "9' is struck. The previously set pin which held the pin-wheel 11 against rotation is restored to its unset position during the rotation of pin-wheel 11, by a cam 33, which lies in the path of the set pin.

Thus, the pin-wheel 11 has an indexing movement and valuates the extent of drive of the shaft 12 by the motor 16 to correspond with the values of the numeral keys actuated. This valuating or indexing movement, as controlled by this escapement mechanism, is transmitted to master wheels 34 and 35 of a long totalizer 36 and a short totalizer 37, respectively. The train of gearing from the shaft 12 includes a beveled gear 38, secured to this shaft, which drives a beveled gear 39, secured to a horizontal shaft 40. The shaft 40 is connected by a pair of beveled gears 41 and 42 to a vertical shaft 43.

The vertical shaft 43 can drive master wheel shafts 44 and 45 in either one or the other direction for addition or subtraction. For this purpose, there are loosely mounted on the shaft 43 two pairs of oppositely-facing beveled gears, indicated specifically by the numbers 46 to 49. The pair of gears 46, 47, mesh with and drive a beveled gear 50 secured to the long totalizer master wheel shaft 44, while the beveled gears 48 and 49 mesh with and drive a beveled gear 51 secured to the short totalizer master wheel shaft 45. The pair of beveled gears 46, 47, are alternatively connectible with the shaft 43 by means of a clutch 52, which is splined on the shaft 43, and may be shifted from an intermediate neutral or disconnected position to a position engaging and connecting either one of the beveled gears 46, 47, in driven relation toward the shaft 43. Likewise the beveled gears 48, 49, are driven alternatively from the shaft 43 by means of a clutch 53, which is splined on the shaft 43 and can be shifted to connect either the beveled gear 48 or the beveled gear 49 in driven relation with the shaft 43. In this way, the shaft 43 and thus the motor 16 may drive either or both the master wheels an amount corresponding to that determined by the indexing or valuating movement of the pin-wheel 11, and thus determined by the particular numeral key operated. The clutches 52 and 53 may occupy an intermediate neutral position, whereby either of the totalizers can be silenced while the other is computing, or both can be silenced, when it is desired to merely typewrite without computing.

The master wheels drive *seriatim* a series of computing wheels 54 in each totalizer, by engaging with an internal gear 55 provided on each of them. Each of the computing wheels 54 is also provided with an external gear 56, which meshes with and drives a gear 57, provided on the associated one of a series of dial wheels 58, which have numbers inscribed on their surfaces to be exhibited through a sight-opening 59 in a casing 60 of the totalizer.

A complete revolution of a computing wheel and its associated dial wheel is carried to the next higher computing wheel. For this purpose, each of the computing wheels is provided with a starting carry-over tooth 61 (Fig. 5), which, once in a revolution, engages and operates a five-toothed gear 62, Fig. 9. This five-toothed gear forms part of a carry-over unit which includes, in addition to the five-toothed gear 62, a star-wheel 63 and a pinion 64. The carry-over unit is started in its movement by the carry-over tooth 61, so that one of the teeth of the star-wheel 63 is brought within the range of action of an assisting rubber roller 65, secured to a carry-over assisting shaft 66. This rubber roller is constantly rotated and will cause the carry-over unit to complete a fifth of a revolution, thereby enabling the pinion 64 to rotate the next higher computing wheel one-tenth of a revolution by its engagement with the external gear 56, provided thereon. The carry-over units are locked against accidental rotation by spring-held detents 67, which engage between the teeth of the star-wheels 63. The computing wheels 54 are supported partly by sleeves 67ª, which compass the master-wheel shafts, and partly by the carry-over units with the aid of supernumerary gears 68 meshing with the external gears 56 on the computing wheels. As the totalizers themselves travel relatively to the master wheels, the assisting rubber rollers 65 travel with the totalizers. For this purpose, they are each formed, as shown in Figs. 4 and 10, in sections slidingly mounted on a square carry-over shaft 69. The sections of the rubber rollers 65 are located between partitions 70 of the totalizer casing and slide along the carry-over shaft 69 as the associated totalizer travels step by step relatively to its master wheel.

The assisting carry-over shafts 69 are driven from the motor 16 in one direction or the other, according to whether the master wheels are being rotated for addition or for subtraction. For this purpose, a horizontal shaft 71, Fig. 11, is driven from the motor shaft by a train of gearing 72. The horizontal shaft 71, in turn, drives a vertical shaft 73 by means of a pair of beveled gears 74 and 75. The vertical shaft 73 has reverse gear sets similar to the master wheel vertical shaft 43. These reverse gear sets include a pair of beveled and a pair of oppositely-facing gears 76, 77, 78 and 79, loose on the shaft 73. The pair of beveled gears 76, 77, mesh with and drive a beveled gear 80, secured to the assisting carry-over shaft for the long totalizer 36, while the beveled gears 78, 79, mesh with and drive a beveled gear 81 secured to the assisting carry-over shaft of the short totalizer 37. Either one of the pair of beveled gears 76, 77, can be secured in driven relation with the shaft 73 by means of a clutch 82, splined on the shaft 73, and shiftable from an intermediate position in which it connects another of the gears to the shaft to alternative position in which it connects either of the gears to the shaft 73. Likewise the pair of beveled gears 78 and 79 may be driven alternatively from the shaft 73 by means of a clutch 83, which is splined on the shaft 73 and shiftable from an intermediate neutral position to a position to engage and secure the gear 78 or the gear 79 in driven relation with the shaft 73. In this way, either or both the assisting carry-over shafts may be driven or be idle to correspond with the drive and character of drive of the associated master-wheel shafts.

In order that the master-wheel shaft and carry-over shaft may be driven correspondingly in unison, the clutches 52 and 82 are shiftable concomitantly by a lever 84, which has two pins 85, one engaged in a groove in the clutch 52 and the other engaged in the clutch 82. In the same way, the master-wheel clutch 53 and the carry-over clutch 83 for the short totalizer 37 may be shifted concomitantly by a lever 86. These levers have three positions, corresponding to adding, neutral and subtracting conditions of the master-wheel and carry-over shafts.

As stated above, the relative movements between the master wheel and totalizer of the long carriage and the master wheel and totalizer of the short carriage take place in unison, so as to have their computing actions synchronized. The long totalizer 36 is connected to travel with the typewriter carriage 4 as the latter moves step by step in an advancing direction, and thus moves relatively to its master wheel, which is stationary, thereby enabling the master wheel to drive the computing dial wheels of the long totalizer.

The short totalizer carriage 87 is provided with rollers 88, whereby it may travel on a guideway 88ª. The carriage 87 is connected to travel with the long totalizer 36 by means of a hook 89, which is arranged to be picked up repeatedly by a series of pick-up stops or lugs 90, adjustably mounted on a rack bar 91 carried by the long totalizer 36. The rack bar 91 has teeth arranged at letter-space intervals, so that the lugs 90 can be adjusted to any desired position, thus enabling the driving action of the short totalizer to be synchronized with any computing wheel of the long totalizer. The short totalizer carriage 87 thus moves, when connected to the long totalizer 36, at the same speed and in the same direction as the long totalizer and as the typewriter carriage. The master wheel 35 of the short totalizer 37 also has a step-by-step movement, but in the opposite direction to the short totalizer 37. For this purpose, the carriage 87 of the short totalizer is provided with a rack 101, which travels with the carriage 87 and meshes with a stationary gear 97, which drives, on its opposite side, a rack 98. The rack 98 faces in the opposite direction to the rack 101, so that as the totalizer carriage 87 moves step by step to the left during an advancing movement of the typewriter carriage, the rack 98 will move correspondingly to the right an equal amount. The rack 98 is mounted on a master-wheel carriage 102, which carries the short totalizer master wheel 35. Thus, as the short totalizer 37 travels step by step to the left with its computing wheel, the master wheel 35 therefor travels step by step to the right, but in the opposite direction. This gives double the movement that would be otherwise obtained if either were stationary and only one of them traveling. By this arrangement, the dial wheels 58 for the short totalizer can be made twice as wide, enabling the numbers to be larger and more easily read.

The hook 89 is disconnected from each of the pick-up stops 90 when the limit of capacity of the short totalizer 37 is reached. This is done by a fixed disconnector stop 92 having a cam surface 93 engaging in an inclined cam surface 94 provided on the connecting hook 89. This disconnecting action is done against the tension of a spring 95, which normally holds the hook 89 in a position to engage one of the pick-up stops 90. The short totalizer 37 and its master wheel 35 are returned to their initial relative positions by a spring-drum 96 connected to the gear 97, and which was wound up step by step with the advancing relative movements of the master wheel 35 and the totalizer 37. At the end of a typewriten line, the typewriter carriage 4 is returned and tends to pick up the hook 89 repeatedly and attempts to overreturn the short totalizer carriage 87. To prevent the typewriter carriage and the long totalizer from overreturning the short totalizer traveling parts, a second disconnector stop 99 is provided, which engages an inclined surface 100 provided on the hook 89. The relative arrangement of the disconnector 99 and the inclined surface 100 is such that the spring-drum 96 will not be strong enough to withdraw the hook 89 to such a position that the pick-up stops 90 cannot properly engage the hook 89 during an advancing movement of the typewriter carriage and the long totalizer 36.

The machine may be used to compute various types of work, but is especially adapted for vertical and cross-totaling, in which the machine affords a check on itself. For example, if a series of vertical columns of numbers corresponding to different computing zones are to be computed, they may be added up vertically in several columns and at the same time added horizontally in the horizontal rows or lines. The long totalizer 36 may have its computing wheels grouped so as to correspond to several small totalizers. Each group may be used to add vertically a series of numbers arranged in a vertical column or computing zone. The pick-up stops 90 are arranged at proper points to correspond with the groupings of the computing wheels of the long totalizer 36, so that the short totalizer 37 will be picked up at the proper intervals to enable it to compute in synchronism with the several groups of computing wheels of the long totalizer separately.

For one form of vertical and cross-totaling, the long totalizer may be started at the first computing zone for the first number of the initial line of writing. The first pick-up stop 90 will engage the hook 89 and the long totalizer will carry the carriage 87 of the short totalizer along with it. This carries the computing wheels and dial wheels of the short totalizer 37 at the same rate of speed as the computing wheels and dial wheels of the long totalizer. The master wheel of the short totalizer, however, is traversed in the opposite direction by the double rack and gear arrangement, so that twice the relative movement is obtained for the short totalizer as is obtained for the long totalizer. This is provided for, however, by the extra width of the computing wheels of the short totalizer. Thus, the first number will be run up in the first group of computing wheels of the long totalizer and in the computing wheels of the short totalizer. When the end of this first zone is reached and the first number computed, the hook 89 will be disconnected from the first pick-up stop 90 by the disconnector 92. This permits the spring-drum 96 to return both the short totalizer carriage 87 and the master-wheel carriage 102, causing the computing wheels and the master wheel of the short totalizer to reassume their initial relative positions.

The next pick-up stop will engage and catch on the hook 89, carrying the short totalizer 37 along in unison with the long totalizer 36, but in synchronism with the second group of computing wheels. The number of the second major vertical column or computing zone is then simultaneously accumulated in the second group of computing wheels of the long totalizer, and the computing wheels of the short totalizer. In the case of the short totalizer, the second number is added to the number already accumulated therein in the first computing zone or major column. This is repeated for the first line of numbers. At the end of the first line of numbers, there will be a single number accumulated in each of the groups of computing wheels in the long totalizer, and the sum of the numbers of all of the vertical columns or the numbers in the first line in the short totalizer. The last group of computing wheels of the long totalizer may be reserved for the cross-total accumulated by the short totalizer 37. That is to say, when the last column on the work-sheet is reached, the cross-total accumulated in the short totalizer 37 may be transcribed on the work-sheet with the long totalizer set for addition, and the short totalizer set for subtraction. This will run up the total in the last group of computing wheels in the long totalizer and clear the same sum from the computing wheels of the short totalizer.

The next line of numbers can likewise be typewritten and computed. The number in each major column or computing zone will be added to the numbers previously accumulated in the various groups of the computing wheels of the long totalizer. The cross-total of the second line of numbers may also be transcribed to the work-sheet, and will be added to the number already accumulated in the last group of computing wheels of the long totalizer. This is repeated line by line, the short totalizer being cleared at the end of each line and the cross-total accumulated in the last group of computing wheels of the long totalizer and transcribed in the last column or computing zone on the work-sheet.

When all the lines of numbers to be computed have been written on the work-sheet, the several groups of computing wheels of the long totalizer are the separate sums of the vertical columns or computing zones. The last group of computing wheels of the long totalizer will have the gross-total of all of the numbers typewritten and computed. The long totalizer may then be set for subtraction and the short totalizer set for addition, and the numbers transcribed from the groups of computing wheels of the long totalizer. If the work is done correctly, the writing of the sums of the vertical columns, at the foot of each column, will clear the associated group of computing wheels of the long totalizer to zero, indicating that that part of the work has been done correctly.

For the last computing zone of the work-sheet and the last group of wheels of the long totalizer, the long totalizer is still maintained for subtracting and will exhibit the sum of the cross-totals. The short totalizer will exhibit the cross-total of the vertical sums as transcribed. At this point, the number exhibited on the last group of computing wheels of the long totalizer should correspond to the sum-total computed by the short totalizer. This is the gross-total. The short totalizer is shifted to subtract. Then this gross-total is transcribed on the work-sheet at the foot of the column of cross-totals, which will clear to zero both the last group of the computing wheels of the long totalizer and the computing wheels of the short totalizer. This will give a check on the work, indicating that the numbers as written on the work-sheet have been accurately summed up, both horizontally and vertically, and that the gross-total of the numbers written is correct.

As heretofore stated, this application is a division of my prior application, Serial No. 428,020, filed April 20, 1908, said prior application being held in the Patent Office because involved in interference. The claims of this application are limited to the modification herein disclosed, no claims being made herein which can be made in said prior application.

Variations may be resorted to within the scope of the invention, and portions of the improvements may be used without others.

Having thus described my invention, I claim:

1. In a combined typewriting and computing machine, the combination with the letter-spacing carriage of a typewriter, of a computing mechanism comprising a totalizer having relatively wide number wheels and a master-wheel therefor, said totalizer and master-wheel being each so mounted as to be laterally movable, and means controlled by the letter-spacing movements of said carriage for imparting step-by-step movements to both the master-wheel and the totalizer, each in a direction opposite to that of the other, so that the relative movement between the master-wheel and the totalizer at each step will be of greater extent than that of the letter-spacing movement of the carriage by which it is controlled.

2. In a combined typewriting and computing machine, the combination with the letter-spacing carriage of a typewriter, of a computing mechanism comprising, as two elements, a totalizer having relatively wide number wheels and a master-wheel, said totalizer and master-wheel being each so mounted as to be laterally movable, means for connecting one of said computing mechanism elements to said carriage, so that it will be moved step-by-step in accordance with the letter-spacing movements thereof, and a reverse-movement connection between the carriage-connected element and the other, so that each element will be moved in a direction opposite to that of the other, their relative movement at each step being of greater extent than the letter-spacing movement of the carriage by which it is effected.

3. The combination with a typewriter carriage, of a totalizing mechanism comprising several groups of wheels and connected to travel with said typewriter carriage, a short totalizer comprising broader wheels for computing in synchronism with the various groups, a master wheel for said carriage totalizing mechanism, a traveling master wheel for said short totalizer, and means for intermittently traversing both said short totalizer and the master wheel for said short totalizer in unison with said carriage.

4. The combination with a typewriter carriage, of a long totalizer connected to travel with said typewriter carriage, a master wheel for said long totalizer, a traveling short totalizer for computing in synchronism with the various sections of said long totalizer, a traveling master wheel for running up numbers in said short totalizer, means for intermittently connecting said short totalizer to travel in unison with said long totalizer, a carriage for the traveling master wheel of said short totalizer, and a driving train between said short totalizer and its master wheel carriage, enabling said short totalizer to drive said master wheel simultaneously in the opposite direction to which it itself is moved.

5. The combination with a typewriter carriage, of a long totalizer connected to travel with said typewriter carriage, a stationary master wheel for said long totalizer, a secondary computing unit comprising two primary elements, to wit, a traveling short totalizer and a traveling master wheel therefor, means for intermittently traversing one of said primary elements of said secondary computing unit with said long totalizer, and a driving train between the traveling element of said short totalizer and the other traveling element thereof, enabling the one to drive the other in the opposite direction.

6. The combination with a typewriter carriage, of a long totalizer traveling with said typewriter carriage, a master wheel for said long totalizer, a short totalizer, a carriage for said short totalizer, intermittent pick-up connections between said long totalizer and said short totalizer carriage, a master wheel for said short totalizer, a rack connected to said short totalizer carriage, a gear meshing with said rack, a carriage for said short totalizer master wheel, and a second rack driven by said gear and connected to traverse said short totalizer master wheel carriage.

7. The combination with a typewriter carriage, of a long totalizer connected to travel with said typewriter carriage, a master wheel for driving said long totalizer, a traveling short totalizer, a traveling master wheel for said short totalizer, a driving train for moving said short totalizer and its master wheel simultaneously in opposite directions, and an intermittent pick-up connection for operating said driving train from said long totalizer, enabling said short totalizer and its master wheel to have repeated vibratory movements for a single continuous movement of said long totalizer.

8. The combination with a typewriter carriage and a totalizer fast thereto and having wheels, of a master wheel therefor, a second totalizer having broader wheels, a master wheel therefor, a computing carriage for causing relative movement between the broader wheels and their master wheel, means for moving said computing carriage by said typewriter carriage, and means for simultaneously turning said master wheels.

9. The combination with a typewriter carriage and a totalizer fast thereto and having wheels, of a master wheel therefor, a second totalizer having broader wheels, a master wheel therefor, a pair of computing carriages for causing relative movement between the broader wheels and their master wheel, means for moving said computing carriages by said typewriter carriage, and means for simultaneously turning said master wheels.

10. In a combined typewriting and computing machine, the combination with the letter-spacing carriage of a typewriter, of a computing mechanism comprising, as two elements, a totalizer having relatively wide number wheels and a master-wheel, said totalizer and master-wheel being each so mounted as to be laterally movable, means for connecting said totalizer to said carriage, so that it will be moved step-by-step in accordance with the letter-spacing movements thereof, and a motion-reversing gear-connection between said totalizer and said master-wheel, so that as said totalizer is moved with said typewriter carriage, said master-wheel will be moved in the opposite direction, the relative movement between the master-wheel and the totalizer at each step being twice as great as the letter-spacing movement of the typewriter carriage by which it is effected.

WALTER WRIGHT.

Witnesses:
CATHERINE A. NEWELL,
EDITH B LIBBEY.